(12) United States Patent
Bennett et al.

(10) Patent No.: US 7,220,455 B2
(45) Date of Patent: May 22, 2007

(54) MATERIAL-SELECTABLE, SELF-HEALING, ANTI-LEAK METHOD FOR COATING LIQUID CONTAINER

(75) Inventors: Ronald G. Bennett, Sherwood, OR (US); Thomas S. Ohnstad, Salem, OR (US); Russell A. Monk, Salem, OR (US)

(73) Assignee: High Impact Technology, LLC, Tigard, OR (US)

( * ) Notice: Subject to any disclaimer, the term of this patent is extended or adjusted under 35 U.S.C. 154(b) by 0 days.

(21) Appl. No.: 11/413,657

(22) Filed: Apr. 27, 2006

(65) Prior Publication Data
US 2006/0269678 A1    Nov. 30, 2006

Related U.S. Application Data

(60) Provisional application No. 60/683,939, filed on May 24, 2005.

(51) Int. Cl.
*B05D 5/00* (2006.01)
*B05D 1/36* (2006.01)

(52) U.S. Cl. .................. 427/407.1; 427/140
(58) Field of Classification Search .............. None
See application file for complete search history.

(56) References Cited

U.S. PATENT DOCUMENTS

| | | | |
|---|---|---|---|
| 2,403,836 A | 7/1946 | Wagner | |
| 3,664,904 A | 5/1972 | Cook | |
| 3,698,587 A | 10/1972 | Baker et al. | |
| 3,801,425 A * | 4/1974 | Cook | 428/36.2 |
| 4,216,803 A | 8/1980 | Hall | |
| 4,345,698 A * | 8/1982 | Villemain | 220/560.02 |
| 4,728,711 A * | 3/1988 | Rosthauser et al. | 528/73 |
| 5,306,867 A | 4/1994 | Connole et al. | |
| 6,803,400 B1 | 10/2004 | Butterbach et al. | |

* cited by examiner

*Primary Examiner*—William Phillip Fletcher, III
(74) *Attorney, Agent, or Firm*—Jon M. Dickinson, PC; Robert D. Varitz, PC

(57) ABSTRACT

A method for applying a plural-layer coating to the outside of a liquid container to act as an anti-leakage barrier in the event of a penetration wound occurring in the container resulting from a penetrating projectile strike, such as a bullet strike. This method includes (a) forming on the outside of such a container, a first layer optimized for providing an elastomeric wound-closure response, (b) forming on the outside of this first layer a second layer optimized for providing combined elastomeric and liquid-imbibing wound-closure responses, and (c) forming on the outside of such a second layer a third, layer optimized in the same manner as the first layer.

4 Claims, 1 Drawing Sheet

US 7,220,455 B2

MATERIAL-SELECTABLE, SELF-HEALING, ANTI-LEAK METHOD FOR COATING LIQUID CONTAINER

CROSS REFERENCE TO RELATED APPLICATION

This application claims priority to prior-filed, currently U.S. Provisional Patent Application Ser. No. 60/683,939, filed May 24, 2005 for "Selective, Elastomer-Family, Self-Healing, Anti-Puncture Coating for Liquid Container". The entire disclosure content of that prior-filed provisional case is hereby incorporated herein by reference.

BACKGROUND AND SUMMARY OF THE INVENTION

There has recently been proposed, in general terms, a form of applyable protective barrier coating which may be used on the outside surface of a liquid container, such as a fuel tank or a fuel pipeline, to defeat liquid leakage which might occur as a consequence of a penetration wound, such as from a bullet strike, created in the exposed wall of such a container. This general coating concept is described in prior-filed U.S. patent application Ser. No. 11/067,525, filed Feb. 25, 2005 for "Projectile Barrier and Method", and reference is made herein to that prior-filed regular patent application for the purpose of setting forth a background foundation relevant to the present invention.

In general terms, that prior-filed regular application describes a plural-layer coating in which differently functioning layers are furnished to provide different kinds of wound-closure responses, including liquid-reaction responses, to a liquid-container penetration wound. One of the wound-closure response mechanisms described in this earlier application is offered by a specific high-elastomeric material which alone forms plural ones of the several layers that are employed. This material responds to a puncture wound both with an elastomeric, resilience-memory response, and to some extent with a liquid-imbibing, material-swelling response. Another mechanism is furnished by another plurality of layers, each including a body of essentially the same high-elastomeric material which is used in the elastomeric-material-only layers, along with a distribution of dedicated liquid-imbiber beads that are embedded in this elastomeric body to furnish significant liquid-imbibing, and three-dimensional material swelling and coagulating, responses as a consequence of contact with any liquid which might leak from a penetrated container.

In observing the basic advantages offered by this prior general proposal for a multi-layer protective anti-leak costing, we have discovered that it is possible, utilizing preferably only three layers in a protective barrier coating, to tailor the respective structures of each of these three layers in such a fashion that a protective anti-leak coating can be prepared which may be specially and very effectively optimized to deal specifically with different liquid-container anti-leak protection situations.

In particular, we have observed (a) that a relatively wide range of materials, well beyond those specific materials suggested in the mentioned prior-filed Regular U.S. Patent Application, may be employed as a family from which the most useful elastomeric and liquid-imbiber bead materials may be selected for a particular situation, (b) that the relative thicknesses of different layers in an overall multi-layer coating structure may be adjusted for optimal performance, and (c) that a particular, and most desirable, by-weight population of selected liquid-imbiber bead-like elements may be used in a layer which is formed with an embedding body of a high-elastomeric material. We have also determined that, in each of such three layers wherein high-elastomeric material is employed, the specific elastomeric materials used in these three layers need not be the same. For example, for certain applications, an elastomeric material may be chosen which offers, in addition to an elastomeric memory response to a container penetration, liquid imbibing and material-swelling responses, in other applications, an elastomeric material may be selected which offer only an elastomeric memory response.

Further, we have determined that providing a user with a range of elastomeric material and imbiber-bead population selectivity, it is possible to optimize individually each of the three layers in an overall coating for best performance in accordance with a particular kind of container anti-leakage protection which is desired.

These and other important advantages and features of the present invention, which improve upon the invention disclosed in the above-mentioned, prior-filed, Regular U.S. patent application, will become more fully apparent as the description of the present invention which now follows is read in conjunction with the accompanying drawings.

DETAILED DESCRIPTION OF THE INVENTION

Figure 1:
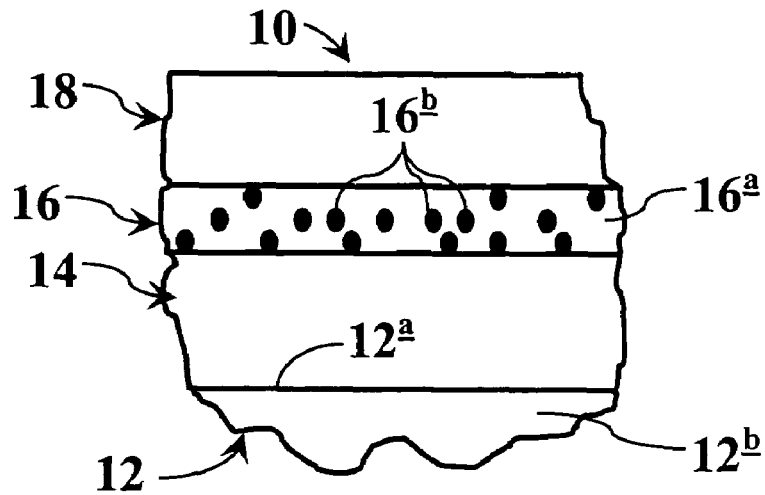
FIG. 1 is a simplified, fragmentary, cross-sectional view illustrating a three-layer, anti-leakage protective coating applied to the outside surface of the wall in a liquid container in accordance with practice of the present invention.

Turning now to the drawings, and referring first of all to FIG. 1, indicated generally at 10 is a three-layer anti-leakage coating, or barrier, which has been applied in accordance with practice of the present invention (one modification thereof) to the outside surface 12a in the wall 12b of a liquid container 12. For the purpose of illustrating the present invention, it will be assumed that container 12 is a metallic tank which forms part of a military fuel tanker vehicle, with this container carrying hydrocarbon fuel. It should be understood that this specific environment with respect to a container carrying a particular kind of liquid is illustrative only, and those skilled in the art should recognize that practice of the present invention may be implemented with regard to other kinds of containers carrying other kinds of liquids.

As pictured in FIG. 1, barrier coating 10 includes three spray-applied layers 14, 16, 18, with layers 14, 18 being formed substantially purely of a high-elastomeric material shortly to be described, and layer 16 being formed as a composite-material layer including a body 16a of high-elastomeric material in which there is a distribution of a plurality of liquid-imbiber bead-like elements, or beads, 16b. Layer 16, in accordance with practice of the present invention has a layer thickness which is less than the thicknesses of each, respectively, of layers 14, 18. A preferred set of relative layer thicknesses herein involves layers 14, 18 each having a layer thickness of about ¼-inches, and intermediate layer 16 having a layer thickness of about ⅛-inches. Within layer 16, the incorporated liquid-imbiber beads form about 22-percent by weight of layer 16.

With respect to spray application and creation of the above several layers that are associated with implementation and practice of this invention, a word here about the use of a "receiving-surface" primer for layer adhesion assistance will be useful.

Where the receiving surface is either metal, or painted metal, that surface should be completely dry before primer application. For an unpainted metal surface, normally no special surface texturing is necessary before primer application. However, where painted metal is involved, paint-surface profiling to produce about a 1- to about a 3-mil texture is recommended.

To such a surface, and with respect to the illustrative specific materials which have been chosen herein to disclose the present invention, an appropriate primer, such as the so-called System 251 primer made by Rhino Linings, USA, Inc. in San Diego, Calif., may be used. This primer preferably is applied to create a primer layer having a thickness lying in the range of about 2- to about 5-mils. Manufacturer's instructions are entirely adequate to describe both the details of applying this primer to different surfaces, and the conditions which, after primer application, should be observed to indicate readiness of the primer to receive a sprayed overlayer, such as the innermost elastomeric layer 14 discussed herein which lies closest to the outer surface of a protected liquid container.

After application of this innermost elastomeric layer, and with regard to the recommended use or non-use of such a primer in an interlayer manner as successive barrier-structure layers, such as layers 16, 18, are sprayed into place, we have found that no primer is needed if the relevant interlayer spray interval is less than about 4-hours. If such an interval is greater than about 4-hours, primer use is recommended. The same System 251 primer may be used for such interlayer conditions.

Where the receiving surface for the innermost, barrier-structure elastomeric layer is the outer surface of a plastic container, such as the outer surface of an HDPE fuel tank in a military vehicle, two things preferably should be done to prepare such a surface for elastomeric layer receipt. First, the surface should be scrubbed/scuffed, as with a rotary wire cup brush, to roughen the surface, and to remove any "surface gloss" of this surface. Next, an appropriate adhesion-promoting primer should be sprayed onto the scuffed surface. A suitable primer is the two-part catalyzed product known as DPX-801 plastic adhesive primer made by PPG Industries of Strongsville, Ohio.

Interlayer primer use here should be based upon the same time-interval consideration just discussed above, and an appropriate interlayer primer is the mentioned System 251 primer.

As will become apparent to those skilled in the art from a further reading of the description of the present invention, the relative thicknesses of layers 14, 16, 18, with layer 16 always having the smallest layer thickness, may be chosen differently to suit different applications. Also, the by-weight population occupancy of layer 16 by beads 16b may be different from that which has just been mentioned above in accordance with the opportunity for "tailoring" barrier coating 10 to a particular application.

While, in accordance with practice of the invention, the high-elastomeric materials employed in layers 14, 16, 18 may be respectively dissimilar, in the barrier coating pictured in FIG. 1, the same high-elastomeric material is employed in each of these layers. This illustrative, high-elastomeric material is a product sold under the trademark TUFF STUFF®—a two-part, catalyzable elastomeric material made by the Rhino Linings company identified above and designated with the manufacturer's part numbers 60017 and 60058.

Liquid-imbiber beads 16b are formed herein from a product designated IMB230300 made by Imbibitive Technologies America, Inc. in Midland, Mich.

All three of layers 14, 16, 18 have been spray-applied to achieve the overall three-layer structure pictured in FIG. 1. More specifically, layer 14 has been spray applied directly to the properly primered outside surface 12a in container 12. Layer 16 has been spray-applied to the outside surface of layer 14. Layer 18 has been spray-applied to the outside surface of layer 16. Assuming that the time intervals between layer applications is less than about 4-hours, no interlayer primer need be employed.

With respect to the specific application of the invention illustrated in FIG. 1, where it is the potential leakage of hydrocarbon fuel from a puncture wound in container wall 12b which is to be defeated, respective layers 14, 16, 18, in terms of material selection and relative thickness, as well as population content in layer 16 of the liquid-imbiber beads, have been chosen to optimize, for container 12 and its hydrocarbon fuel content, the respective leakage-control behaviors collectively contributed by the three layers in coating 10. More specifically, layer 14 has been optimized, in accordance with practice of the invention, to provide principally an elastomeric, resilience-memory, wound-closure response to a penetration wound in container 12. The material forming this layer also reacts to contact with hydrocarbon fuel to produce a modest liquid-imbibing and material-swelling response to such contact. Layer 16 has been optimized to provide combined elastomeric and independent (via liquid-imbiber beads 16b) liquid-imbibing, material-swelling wound-closure, responses, coupled with a modest, liquid-imbibing and swelling response furnished by the embedding high-elastomeric material. Layer 18 has been optimized, as is true for layer 14, to responses like those provided by layer 14.

With respect to defining a layered protection system relevant to other kinds of contained liquids, those skilled in the art will appreciate how practice of the present invention offers them the option to select materials for, and to size, layers, such as layers 14, 16, 18, for appropriate respective performance optimizations of these layers. For example, there may be an application where the elastomeric material chosen for layer 14 is best differentiated from that which is employed in layer 16, as well as that which is employed in layer 18.

Practice of the present invention thus offers a user a wide range of choices to achieve such layer-performance optimization.

Figure 2:
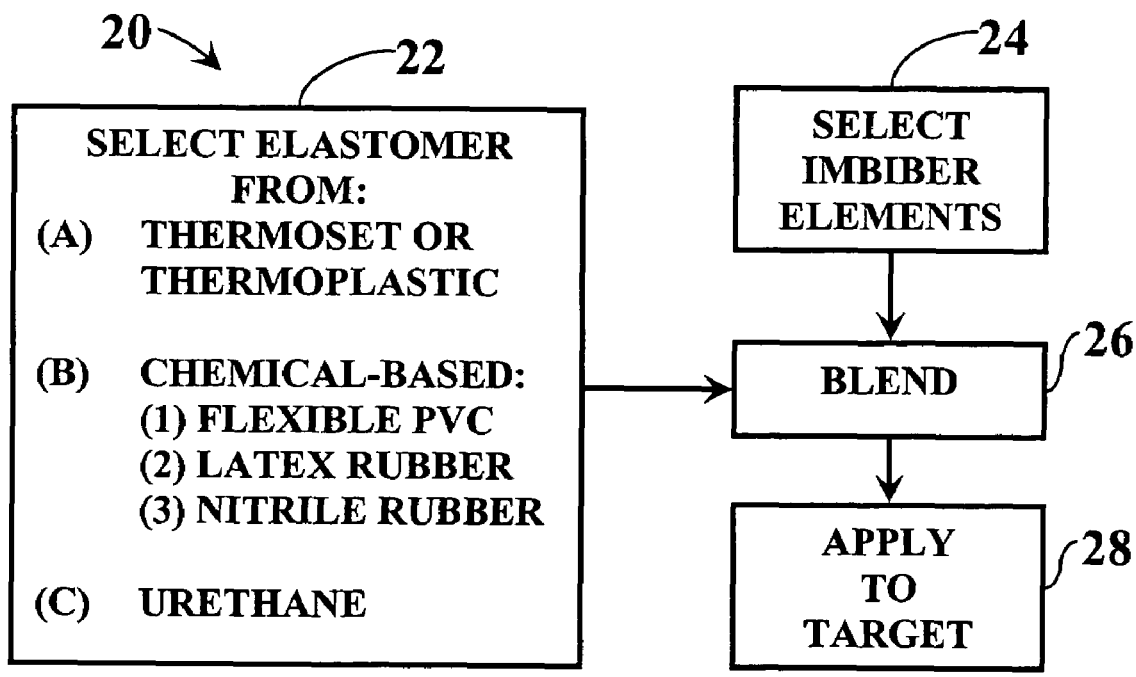
FIG. 2 is a bock/schematic diagram illustrating the architecture of the methodology of the present invention, one version/modification of which was used in conjunction with creating the layered overcoating structure pictured in FIG. 1

Turning attention now to FIG. 2, here, illustrated generally at 20, in block/schematic form, is the methodology architecture for practicing the present invention. Four appropriately interconnected blocks 22, 24, 26, 28 fully describe this architecture. Block 22 represents selection of one of various different kinds of high-elastomeric materials for use respectively in layers 14, 16, 18. Block 24 represents user-selection of a particular kind of imbiber beads, such as those mentioned above, for incorporation into composite layer 16. Block 26 represents blending activities relevant to preparing for spray-creation of layer 16. Block 28 represents the step of spraying to create layers 14, 16, 18. Except as specifically noted below, inasmuch as only layer 16 contains embedded liquid-imbiber beads, block 26 is effectively by-passed during spray-creation of layers 14 and 18.

In the case of creating purely an elastomeric-material layer which is to be formed from two or more interactive, precursor, elastomeric components, such as is the case, with the specific high-elastomeric mentioned above, block 26 performs a blending function for these components prior to passage of the blended result to block 28 for spray application in a layer-creation procedure. If only a single-component elastomeric material is to be used, that material is simply flowed without any kind of blending taking place, to block 28 for spraying.

Thus, to create layers like layers 14, 18, a single- or plural-part elastomeric material is chosen freely from the list of such materials set forth in block 22. Those skilled in the art will readily understand how to select such materials for particular applications. The selected material for a particular elastomeric-only layer is spray-applied to create such a layer having the desired thickness. In the cases of layers 14, 18 herein, the thickness which has been chosen for each of these layers is about ¼-inches.

With respect to creation of a composite-material layer, such as layer 16, an elastomeric material selected from the list shown in block 22, single- or plural-part in nature, is blended (for passing along to block 28) in block 26 with a population of liquid-imbiber beads appropriately selected in accordance with conventional understanding of such bead-like imbiber beads. Appropriate by-weight ratios of elastomeric material and liquid-imbiber beads are chosen for the flows thereof which become blended in block 26. Any suitable conventional approach may be used to adjust these flows to achieve a desired blend. In relation to layer 16 herein, this blend is adjusted so as to create a by-weight percentage of liquid-imbiber beads of about 22-percent.

Blending and spraying of these materials is performed to achieve a desired thickness which, in the case of layer 16 herein, is smaller than the thickness of the two "bracketing" layers 14, 18, and specifically is about ⅛-inches.

Accordingly, a preferred manner of practicing the invention has been illustrated and described. This practice involves a method for applying a plural-layer coating to the outside of a liquid container to act as an anti-leakage barrier in the event of a penetration wound occurring in the container resulting from a projectile strike, such as a bullet strike. This method includes, fundamentally, the steps of: (a) forming essentially directly on the outside surface of such a container a first, non-composite barrier layer which is optimized for providing principally an elastomeric wound-closure response regarding the occurrence of such a strike; (b) forming on the outside of such a first layer a second, composite-material barrier layer which is optimized for combined elastomeric and independent liquid-imbibing wound-closure responses, where the elastomeric body material is selected as expressed above, and where formation of this second layer includes the incorporation of liquid-imbiber, bead-like elements; and (c), forming on the outside of such a second layer a third, non-composite layer which is optimized principally for an elastomeric wound-closure response, and where the elastomeric material employed this third layer is also selectively chosen as expressed above.

Accordingly, while a preferred and best mode manner of practicing the invention has been illustrated and described herein, we appreciate that variations and modifications may be made that will properly lie within the scope of this invention, and we intend that the now-following claims will be read to include all such variations and modifications.

We claim:

1. A method for applying a plural-layer coating to the outside of a liquid container to act as an anti-leakage barrier in the event of a penetration wound occurring in the container resulting from a penetrating projectile strike, said method comprising forming on the outside surface of such a container, a first, non-composite barrier layer which is optimized for providing principally an elastomeric wound-closure response regarding the occurrence of such a strike, where the elastomeric response of this layer is furnished by an elastomeric material selected from the group consisting of thermoplastic materials, thermoset materials, flexible PVC materials, latex rubber materials, nitrile rubber materials, and urethane materials, and forming on the outside of such a first layer a second, composite-material barrier layer which is optimized for combined elastomeric and independent liquid-imbibing wound-closure responses regarding the occurrence of such a strike, where the elastomeric response of this layer is furnished by an appropriate elastomeric material, and the liquid-imbibing response is furnished by appropriately chosen, embedded, liquid-imbiber elements, and forming on the outside of such a second layer a third, non-composite barrier layer which is optimized for providing principally an elastomeric wound-closure response regarding the occurrence of such a strike, and where the elastomeric response of this layer is furnished by an elastomeric material which is also selectively drawn from the same list of elastomeric materials expressed above in relation to the mentioned first layer.

2. The method of claim 1, wherein the three mentioned barrier layers have respective layer thicknesses, with that of the second barrier layer being less than those of each of the first and third barrier layers.

3. The method of claim 1, wherein within the second barrier layer the liquid-imbiber elements account for about 22-percent by weight of the second layer.

4. The method of claim 2, wherein within the second barrier layer, the liquid-imbiber elements account for about 22-percent by weight of the second layer.

* * * * *